United States Patent
Werner

(10) Patent No.: US 8,769,444 B2
(45) Date of Patent: Jul. 1, 2014

(54) MULTI-INPUT GESTURE CONTROL FOR A DISPLAY SCREEN

(75) Inventor: Horst Werner, Muehlhausen-Rettigheim (DE)

(73) Assignee: SAP AG, Walldorf (DE)

( * ) Notice: Subject to any disclaimer, the term of this patent is extended or adjusted under 35 U.S.C. 154(b) by 342 days.

(21) Appl. No.: 12/940,616

(22) Filed: Nov. 5, 2010

(65) Prior Publication Data

US 2012/0113015 A1 May 10, 2012

(51) Int. Cl.
*G06F 3/048* (2013.01)
*G06F 3/01* (2006.01)

(52) U.S. Cl.
CPC ................................ *G06F 3/017* (2013.01)
USPC .................... 715/863; 715/702; 345/173

(58) Field of Classification Search
CPC .................................................. G06F 3/017
USPC .......................................... 345/173; 715/702
See application file for complete search history.

(56) References Cited

U.S. PATENT DOCUMENTS

| | | | |
|---|---|---|---|
| 5,596,656 A | 1/1997 | Goldberg | |
| 6,057,845 A * | 5/2000 | Dupouy | 715/863 |
| 7,812,828 B2 | 10/2010 | Westerman et al. | |
| 2010/0013780 A1 * | 1/2010 | Ikeda et al. | 345/173 |
| 2010/0079388 A1 * | 4/2010 | Ohnishi et al. | 345/173 |
| 2010/0149109 A1 * | 6/2010 | Elias | 345/173 |
| 2010/0295796 A1 * | 11/2010 | Roberts et al. | 345/173 |
| 2010/0302205 A1 * | 12/2010 | Noma | 345/174 |
| 2011/0050562 A1 * | 3/2011 | Schoen et al. | 345/156 |
| 2011/0074710 A1 * | 3/2011 | Weeldreyer et al. | 345/173 |
| 2011/0080341 A1 * | 4/2011 | Helmes et al. | 345/163 |
| 2011/0093778 A1 * | 4/2011 | Kim et al. | 715/702 |
| 2011/0119638 A1 * | 5/2011 | Forutanpour | 715/863 |
| 2011/0122080 A1 * | 5/2011 | Kanjiya | 345/173 |
| 2011/0175821 A1 * | 7/2011 | King | 345/173 |
| 2011/0193795 A1 * | 8/2011 | Seidman et al. | 345/173 |
| 2012/0084662 A1 * | 4/2012 | Navarro et al. | 715/740 |
| 2012/0110519 A1 * | 5/2012 | Werner et al. | 715/863 |

* cited by examiner

*Primary Examiner* — William Titcomb
(74) *Attorney, Agent, or Firm* — Schwegman, Lundberg & Woessner, P.A.

(57) ABSTRACT

Improved multi-input gesture control for a display screen is enabled by using a first screen input to determine control operations that result from a second screen input that is followed by a gesture. A gesture that corresponds to a path traced on a display screen may define a new screen input or manipulate existing screen objects depending on some specific feature of the path or the entirety of the path.

24 Claims, 5 Drawing Sheets

MULTI-INPUT GESTURE CONTROL FOR A DISPLAY SCREEN

FIELD

The present invention relates generally to computing devices and more particularly to screen inputs for computing devices.

BACKGROUND

As computer devices with touchscreens become increasingly commonplace, new ways of user-device-interaction are becoming possible including, for example, zooming and resizing objects with multi-touch gestures. New shapes or characters can also be input directly.

Typically, however, the range of possible control gestures is limited by a requirement to immediately decide what kind of action the user wants to take, and in most cases the system's behavior is determined by the specific area that a user touches and the general direction of the user's gesture. By contrast, conventional desktop computer systems typically include a pointing device that enables at least one alternative input mode (e.g., via a mouse right-click).

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Example embodiments allow a multitude of more complex gestures by a user on a screen of a display device. For example, the user can draw a gesture, e.g., in form of a symbol, on the screen (e.g., using a finger or a pointing device such as a mouse) and the device may determine a corresponding action when the gesture is complete.

Figure 1:
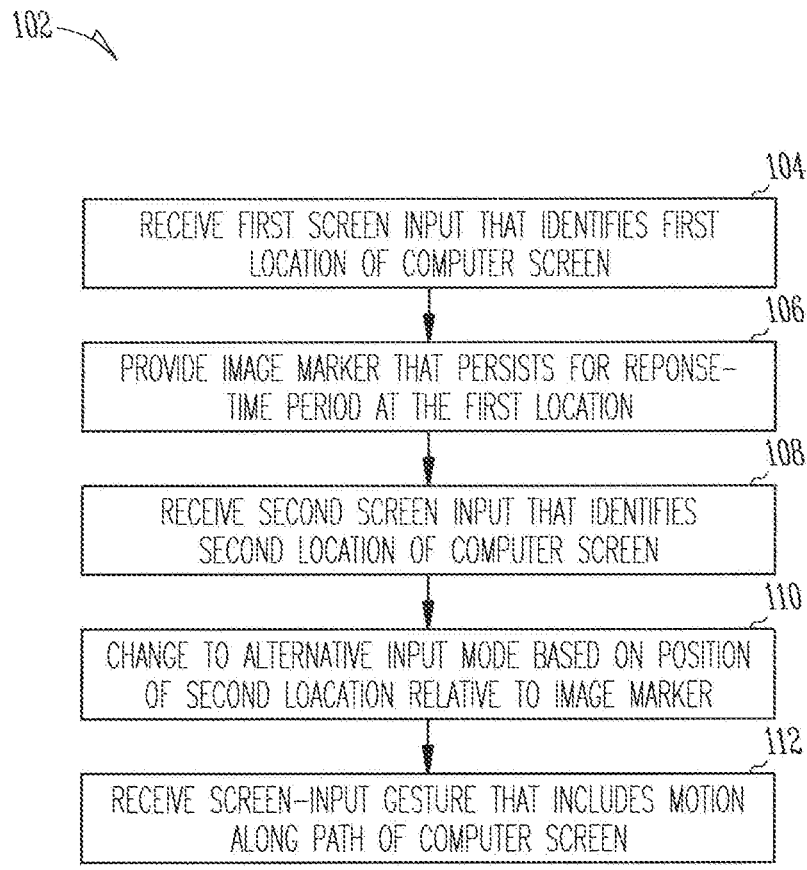
FIG. 1 shows schematic representation of a method of multi-input gesture control for a display screen according to an example embodiment.

FIG. 1 shows schematic representation of a method 102 of multi-input gesture control for a display screen 201 (see FIG. 2A-F) according to an example embodiment. As shown at operation 104, the method 102 begins by receiving a first screen input that identifies a first location or position on the display screen 201. Screen inputs can be accomplished by conventional means including an application of a computer pointing device whose movements are echoed on the display screen by a pointer (e.g., clicking a mouse to position a cursor). In the case of a computer with a touchscreen, the screen input can result from touching the screen, either directly by a user or through a physical pointer (e.g., a wand).

Figure 2A:
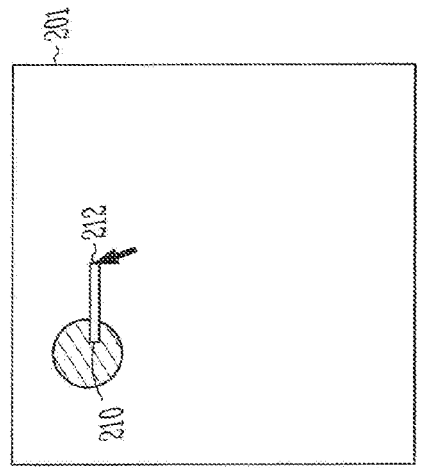
FIGS. 2A, 2B, 2C, 2D, 2E, and 2F show example screen images for the embodiment of FIG. 1 where the completed gesture defines a screen input.

Next, as shown at operation 106, an image marker 204 (see FIG. 2A) is provided at the first location in response to the first screen input. The image marker may persist on the display screen for a response-time period after the first screen input 106. FIG. 2A shows an example screen image where a pointer 202 (e.g., a cursor) is shown as an arrow to indicate the first location on the display screen 201. This pointer 202 is shown to be surrounded by a shaded image marker 204. In this case, the image marker 204 appears as a disk with a circular boundary; however, more general shapes and/or sizes are provided in other example embodiments. In an example embodiment, the image marker 204 surrounds the first location as a continuous single two-dimensional shape without holes (e.g., a simply connected set in the 2-D plane). For example, an irregularly shaped image marker 204 may be shaped to resemble an ink blot that results from touching a sheet of paper with a fountain pen. Accordingly, the ink blot (or any other continuous shape) is displayed on the display screen 201 when the first screen input is received (see operation 104).

As shown at operation 108, the method 102 further includes receiving a second screen input that identifies a second location or position on the display screen 201 during the response-time period after the first screen input. The response-time period allows a user to provide a second and subsequent input relative to the first input. The second input may be used to define a gesture associated with a predefined function of the device (e.g., a portable computer, mobile device such as a cellular telephone, or the like device having a display screen providing a user interface).

Figure 2D:
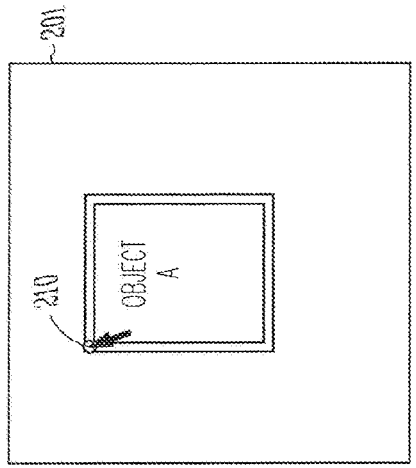
Figure 2B:
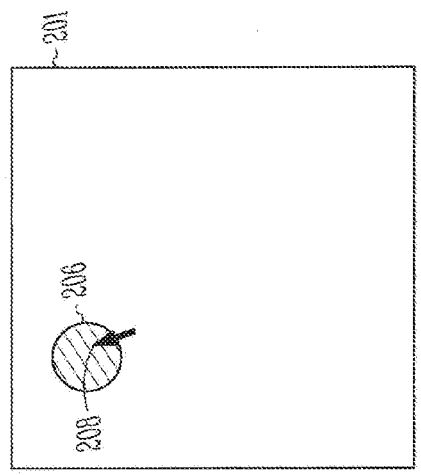

As time passes, the persistence of the image marker 204 during the response-time period can be displayed by a changing the color or intensity of the image marker. For example, the image marker may fade so that it disappears from the display screen 201 by the end of the response-time period. FIG. 2B shows an example where the image marker 206 is faded in color or intensity relative to the original image marker 204, and a pointer 208 indicates the second location on the display screen 201. (Note that the words first and second are used here and elsewhere for labeling purposes only and are not intended to denote any specific spatial or temporal ordering. Furthermore, the labeling of a first element does not imply the presence a second element.)

The method 102 next changes the input mode to an alternative input mode for the display screen 201 based on the position of the second location relative to the image marker 110. The method 102 next includes receiving a gesture as a screen input in the alternative input mode, where the gesture includes a motion along a path on the display screen 201 starting from the second location 112. In general, this path starts at the second location and ends at some completion of the gesture, either by explicitly terminating the input (e.g., releasing the computer pointing device or pointer) or satisfying some completion condition (e.g., completing a closed curve as in FIG. 2F below).

Figure 2E:
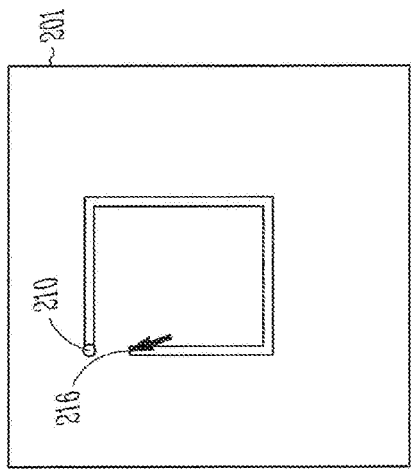
Figure 2C:
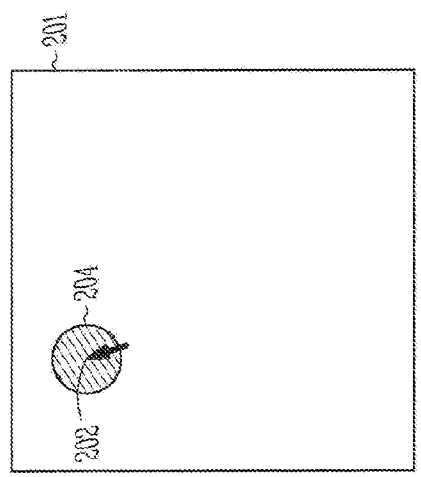
Figure 2F:
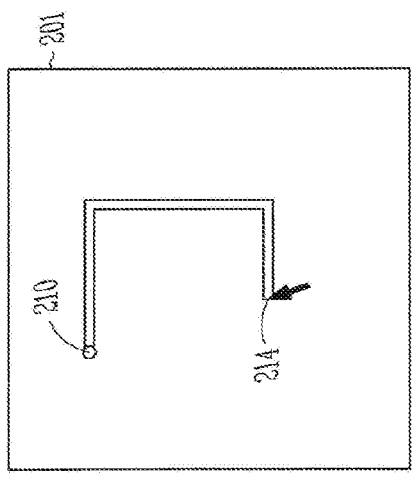

For example, in FIG. 2B the second screen input pointer 208 lies within the image marker 206 and triggers an input mode where the subsequent gesture input defines a new shape on the display screen (e.g., a characterization by spatial attributes). FIG. 2C shows an example spatial outline defined by the motion of the pointer from the second location 210 to a subsequent point 212 in the path. FIG. 2D shows the screen image after reaching a later point 214 in the path, where the image marker 206 is no longer shown (e.g., after the response-time period). The image marker 206 may however continue to be displayed to indicate that the gesture is being received as a screen input. FIG. 2E shows the screen image after reaching a still later point 216 in the path. Eventually the gesture input is interpreted as a new shape whose outline is defined by the traced path (e.g., object A in FIG. 2F). This may result, for example, when the path returns to (or becomes sufficiently close to) the second location 210. Thus, the user can "draw" the gesture on the display screen 201. In response to completion of the gesture, an application program of the device may then perform associated functionality.

More generally, this alternative input mode may use the completed gesture to define a screen input including, for example, generating a new shape (e.g., as in FIG. 2F), grouping existing shapes (e.g., by surrounding them by a closed curve), deleting shapes (e.g., by a cross-out gesture), and invoking special operations on a shape (e.g., by associating specific gestures with special operations on certain shape types). Furthermore, in a case where multi-touch hardware is employed, the image marker 206 can be used as an additional input (e.g., second or third touchscreen input).

Alternative input modes may also enable the manipulation of existing screen objects (e.g., by zooming or re-sizing), either based on a completed gesture or operating continuously as the corresponding path is traced. FIG. 3A shows a display screen 301 including an example screen image that includes two objects labeled A and B. FIG. 3B shows a screen image where a pointer 302 (e.g., a cursor) is shown as an arrow to indicate the first location on the display screen 301. Similarly as in FIG. 2A, this pointer 302 is surrounded by a shaded image marker 304.

Figure 3C:
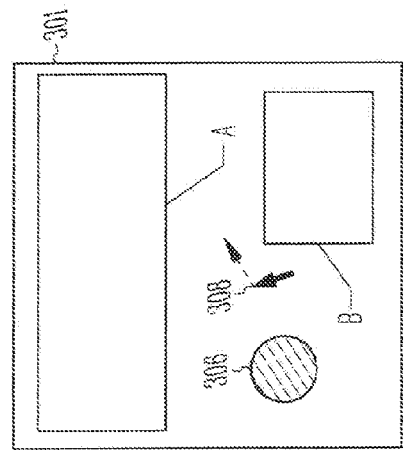
FIGS. 3A, 3B, 3C, 3D, 3E, and 3F show example screen images for the embodiment of FIG. 1 where the gesture enables a manipulation of existing screen objects.
Figure 3F:
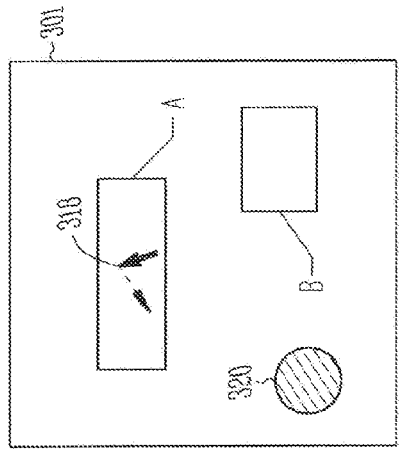
Figure 3B:
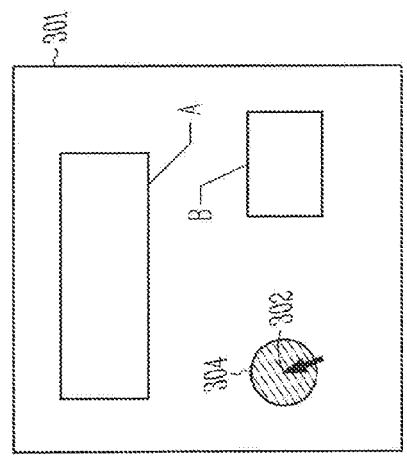
Figure 3E:
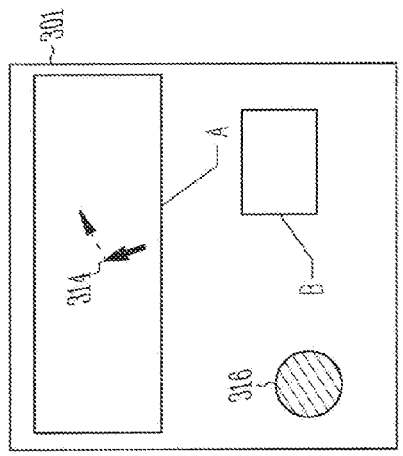
Figure 3A:
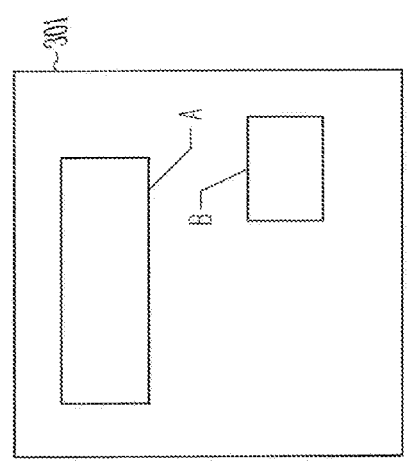
Figure 3D:
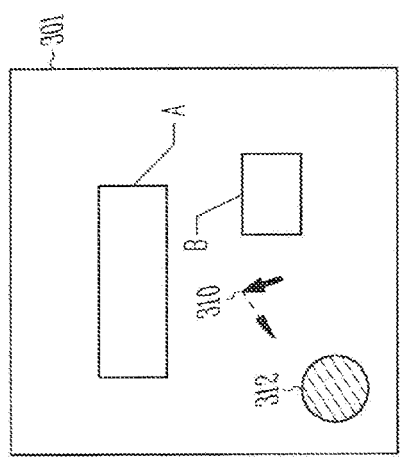

FIG. 3C shows a screen image including the optionally faded image marker 306 and a pointer 308 that indicates the second location on the display screen 301. Starting from the pointer 308, a broken directed line is shown to indicate the motion of the gesture. In an example embodiment, the gesture may operates in this mode to resize objects A and B in correspondence to the continuously changing position along the path of the gesture relative to the first location (e.g., the center of the image marker 306.) In this example, motion away from the image marker 306 expands objects A and B proportionately until the gesture is completed (e.g., by releasing the computer pointing device or pointer). FIG. 3D shows a screen image where motion from the second location 310 towards the image marker 312 contracts objects A and B proportionately. In FIGS. 3C and 3D the second location 308, 310 lies outside objects A and B and the resizing operation is applied both objects. FIGS. 3E and 3F each illustrate examples where the resizing operation can be focused to a specific screen object by locating the second location within that object. In FIG. 3E the second location 314 lies within object A, and motion from the second location 314 away from the image marker 316 expands object A but leaves object B unchanged. In FIG. 3F the second location 318 lies within object A, and motion from the second location 318 towards the image marker 320 contracts object A but leaves object B unchanged.

The example resizing operations described above (e.g., FIGS. 3C, 3D, 3E, and 3F) can be carried out through linear scaling operations based on planar coordinates of the shapes. In FIG. 3C for example, if the center (or some reference point) of the image marker 306 has coordinates $(x_0, y_0)$ and the pointer 308 is moved from coordinate $(x_1, y_1)$ to coordinate $(x_2, y_2)$ on the display screen, scale factors for resizing in the x and y dimensions may be as follows:

$$S_x = \left|\frac{x_2 - x_0}{x_1 - x_0}\right| \quad S_y = \left|\frac{y_2 - y_0}{y_1 - y_0}\right|. \tag{1}$$

Then sizes (e.g., line lengths) and positions (e.g., (x,y) coordinates) are calculated by the following formulas for updating these values:

$$\text{Size}_x' = \text{Size}_x * S_x \quad \text{Size}_y' = \text{Size}_y * S_y \tag{2}$$

$$x' = x + x_0 * (1 - S_x) \quad y' = y + y_0 * (1 - S_y). \tag{3}$$

Additional example embodiments relate to an apparatus for carrying out any one of the above-described methods. The apparatus may include a computer for executing computer instructions related to the methods described herein by way of example. In this example context the computer may be a general-purpose computer including, for example, a processor, memory, storage, and input/output devices (e.g., keyboard, display, disk drive, Internet connection, etc.). However, the computer may include circuitry or other specialized hardware for carrying out some or all aspects of the method. In some operational settings, the apparatus or computer may be configured as a system that includes one or more units, each of which is configured to carry out some aspects of the method either in software, in hardware or in some combination thereof. For example, the system may be configured as part of a computer network that includes the Internet. At least some values for the results of the method can be saved for later use in a computer-readable medium, including memory units (e.g., RAM (Random Access Memory), ROM (Read Only Memory)) and storage devices (e.g., hard-disk systems, optical storage systems).

Additional embodiments also relate to a computer-readable medium that stores (e.g., tangibly embodies) a computer program for carrying out any one of the above-described methods by means of a computer. The computer program may be written, for example, in a general-purpose programming language (e.g., C, C++) or some specialized application-specific language. The computer program may be stored as an encoded file in some useful format (e.g., binary, ASCII). In some contexts, the computer-readable medium may be alternatively described as a computer-useable medium, a computer-storage medium, a computer-program medium or some alternative non-transitory storage medium. Depending on the on the operational setting, specified values for the above-described methods may correspond to input files for the computer program or computer.

Figure 4:
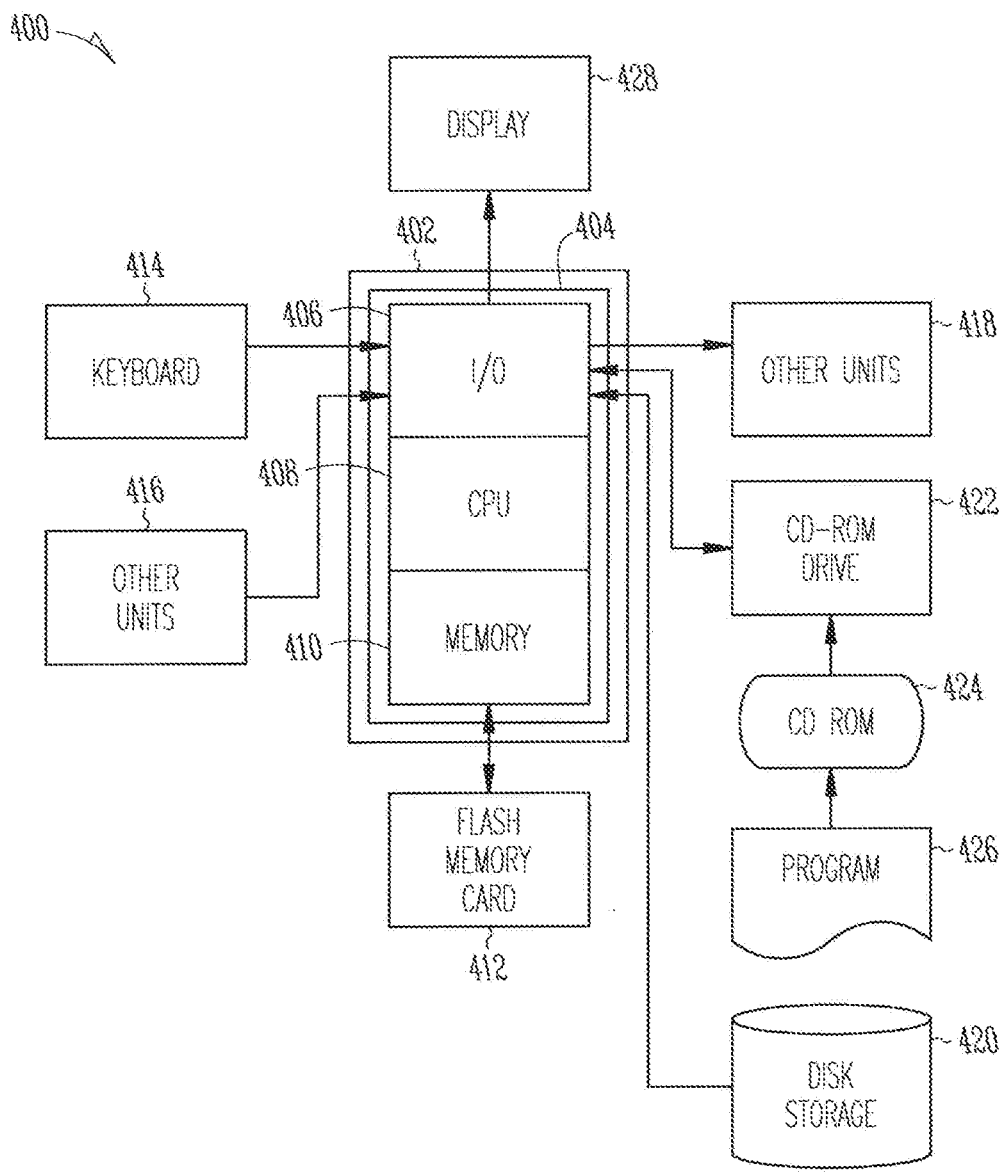
FIG. 4 shows a block diagram of a computer system within which a set of instructions, for causing the computer to perform any one or more of the methodologies discussed herein, may be executed.

As described above, certain embodiments of the present invention can be implemented using standard computers and networks including the Internet. FIG. 4 shows a conventional general purpose computer 400 with a number of standard components. The main system 402 includes a motherboard 404 having an input/output (I/O) section 406, one or more central processing units (CPU) 408, and a memory section 410, which may have a flash memory card 412 related to it. The I/O section 406 is connected to a display 428 which may allow touchscreen inputs, a keyboard 414, other similar general-purpose computer units 416, 418, a disk storage unit 420 and a CD-ROM drive unit 422. The CD-ROM drive unit 422 can read a CD-ROM medium 424 which typically contains programs 426 and other data.

Figure 5:
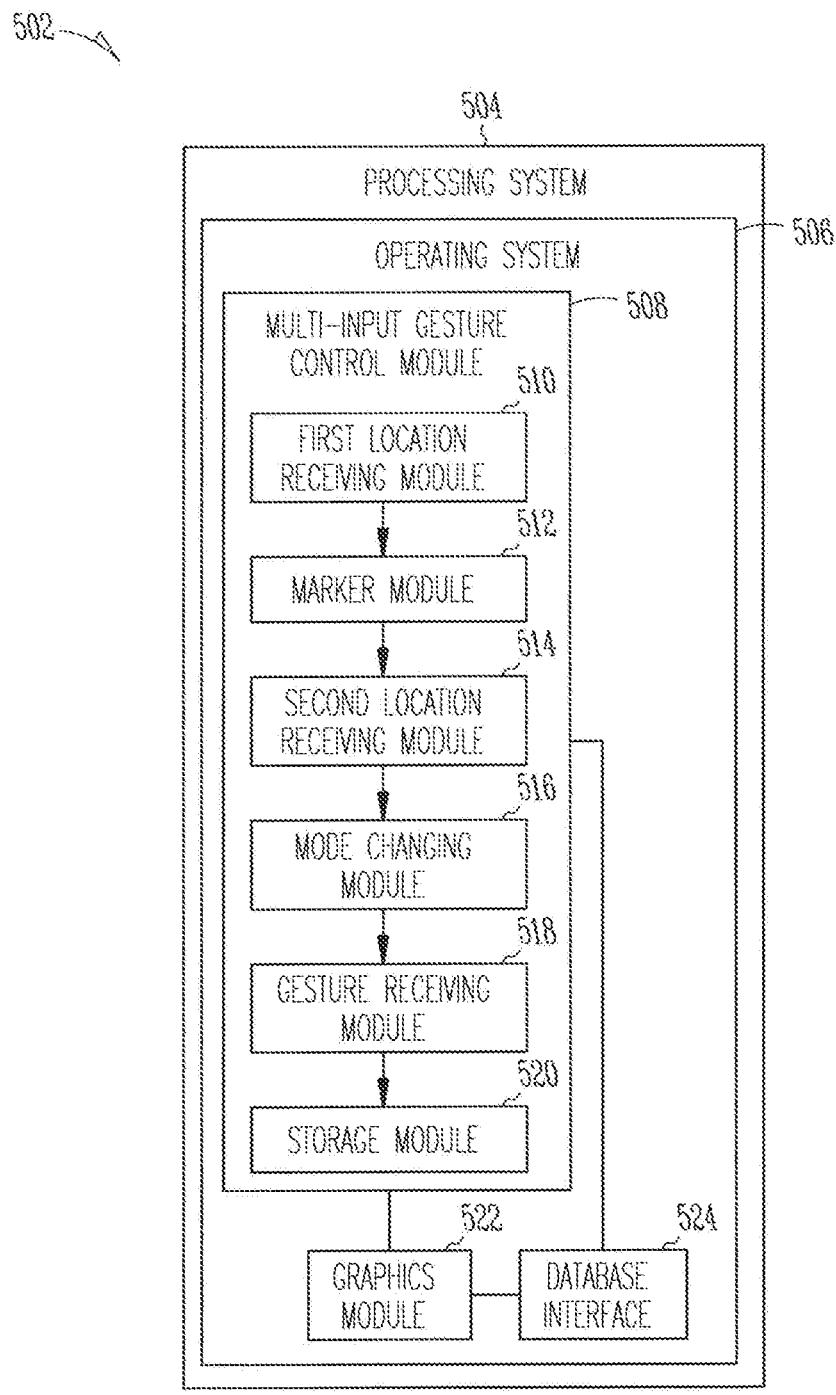
FIG. 5 shows a schematic representation in accordance with an example embodiment for multi-input gesture control of a display screen.

FIG. 5 shows a schematic representation of an apparatus 502, in accordance with an example embodiment for multi-input gesture control of a display screen. For example, the apparatus 502 may be used to implement the method 102 of multi-input gesture control as described above. The apparatus 502 is shown to include a processing system 504 that may be implemented on a server, client, or other processing device that includes an operating system 506 for executing software instructions.

In accordance with an example embodiment, the apparatus 502 includes a multi-input gesture control module 508 that includes a first location-receiving module 510, a marker module 512, a second location-receiving module 514, a mode-changing module 516, a gesture-receiving module 518, and a storage module 520. The first location-receiving module 510 operates to receive a first screen input that identifies a first location on the display screen. The marker module 512 operates to provide an image marker at the first location in response to the first screen input, where the image marker persists on the display screen for a response-time period after the first screen input. The second location-receiving module 514 operates to receive a second screen input that identifies a second location on the display screen during the response-time period after the first screen input. The mode-changing module 516 operates to change to an alternative input mode for the display screen based on a position of the second location relative to the image marker. The gesture-receiving module 518 operates to receive a gesture as a screen input in the alternative input mode, where the gesture includes a motion along a path on the display screen starting from the second location. The storage module 520 operates to persistently store display screen data that identifies the first location, the image marker, the second location, and the gesture.

In addition, a graphics module 522 operates to render images on the display screen and a database interface 524 operates to enable access to remote data storage. The database interface 524 may provide database management functionality including a database application, a database management system (DBMS), one or more databases (local and/or remote), input/output (I/O) buffer caches, and the like. The database application may provide order fulfillment, business monitoring, inventory control, online shopping, and/or any other suitable functions by way of interactions with other elements of the processing system 504. According to some example embodiments, the database application communicates with the DBMS over one or more interfaces provided by the DBMS. The database application may, in turn, support client applications executed by client devices.

The DBMS may comprise any suitable system for managing a database instance. Generally, the DBMS may receive requests for data (e.g., Structured Query Language (SQL) requests from the database application), may retrieve requested data from the database and may return the requested data to a requestor. The DBMS may also perform start-up, logging, recovery, management, optimization, monitoring, and other database-related tasks.

Although only certain example embodiments of this invention have been described in detail above, those skilled in the art will readily appreciate that many modifications are possible in the example embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A method of multi-input gesture control for a display screen, the method comprising:
   receiving a first screen input that identifies a first location on the display screen;
   providing an image marker at the first location in response to the first screen input, the image marker persisting on the display screen for a response-time period after the first screen input;
   receiving a second screen input that identifies a second location on the display screen during the response-time period after the first screen input;
   changing to an alternative input mode based on a position of the second location relative to the image marker, the alternative input mode being selected from a first input mode for drawing a new shape on the display screen if the second location lies inside the image marker and a second input mode for resizing an existing shape on the display screen if the second location lies outside the image marker; and
   receiving a gesture as a screen input in the alternative input mode, the gesture including a motion along a path on the display screen starting from the second location, the path determining an outline of the new shape in the first input mode, and the path determining a scale factor for resizing the existing shape in the second input mode.

2. The method of claim 1, wherein
   the image marker surrounds the first location as a single two-dimensional shape,
   a persistence of the image marker is displayed by changing a color or intensity of the image marker over the response-time period, and
   a disappearance of the of the image marker corresponds to an end of the response-time period.

3. The method of claim 1, wherein the path of the gesture in the first input mode defines an input to an application program that generates the new shape on the display screen based on one or more spatial attributes of the path.

4. The method of claim 1, wherein the gesture in the first input mode defines the new shape by completing a closed curve that corresponds to the outline of the new shape.

5. The method of claim 1, wherein the path starting from the second location defines the new shape in the first input mode by reaching a path-ending location that satisfies a completion condition for the new shape.

6. The method of claim 1, wherein the scale factor in the second input mode is based on one or more line lengths measured from the image marker to the path.

7. The method of claim 1, wherein the first and second screen inputs and the gesture each result from touching the display screen.

8. The method of claim 1, wherein the first and second screen inputs and the gesture each result from an application of a pointing device whose movements are echoed on the display screen by a pointer.

9. The method of claim 1, wherein the alternative input mode enables the motion along the path starting from the second location in an arbitrary direction.

10. The method of claim 1, wherein the scale factor in the second input mode is calculated as a ratio of two line lengths measured from the image marker to the path.

11. The method of claim 1, wherein the outline of the new shape is unconstrained by the first input mode.

12. The method of claim 1, wherein the existing shape is resized in the second input mode by changing a size of the new shape in proportion to one or more ratios of line lengths measured from the second image marker to the second path.

13. A non-transitory computer-readable medium embodying instructions which, when executed by a computer, cause the computer to perform operations comprising:
   receiving a first screen input that identifies a first location on the display screen;
   providing an image marker at the first location in response to the first screen input, the image marker persisting on the display screen for a response-time period after the first screen input;
   receiving a second screen input that identifies a second location on the display screen during the response-time period after the first screen input;
   changing to an alternative input mode based on a position of the second location relative to the image marker, the alternative input mode being selected from a first input mode for drawing a new shape on the display screen if the second location lies inside the image marker and a second input mode for resizing an existing shape on the display screen if the second location lies outside the image marker; and
   receiving a gesture as a screen input in the alternative input mode, the gesture including a motion along a path on the display screen starting from the second location, the path determining an outline of the new shape in the first input mode, and the path determining a scale factor for resizing the existing shape in the second input mode.

14. The computer-readable medium of claim 13, wherein
the image marker surrounds the first location as a single two-dimensional shape,
a persistence of the image marker is displayed by changing a color or intensity of the image marker over the response-time period, and
a disappearance of the of the image marker corresponds to an end of the response-time period.

15. The computer-readable medium of claim 13, wherein the path of the gesture in the first input mode defines an input to an application program that generates the new shape on the display screen based on one or more spatial attributes of the path.

16. The computer-readable medium of claim 13, wherein the gesture in the first input mode defines the new shape by completing a closed curve that corresponds to the outline of the new shape.

17. An apparatus including a display screen, the apparatus comprising:
   a first location-receiving module to receive a first screen input that identifies a first location on the display screen;
   a marker module to provide an image marker at the first location in response to the first screen input, the image marker persisting on the display screen for a response-time period after the first screen input;
   a second location-receiving module to receive a second screen input that identifies a second location on the display screen during the response-time period after the first screen input;
   a mode-changing module to change to an alternative input mode for the display screen based on a position of the second location relative to the image marker, the alternative input mode being selected from a first input mode for drawing a new shape on the display screen if the second location lies inside the image marker and a second input mode for resizing an existing shape on the display screen if the second location lies outside the image marker;
   a gesture-receiving module to receive a gesture as a screen input in the alternative input mode, the gesture including a motion along a path on the display screen starting from the second location, the path determining an outline of the new shape in the first input mode, and the path determining a scale factor for resizing the existing shape in the second input mode; and
   a storage module to persistently store display screen data that identifies the first location, the image marker, the second location, and the gesture.

18. The apparatus of claim 17, wherein
the image marker surrounds the first location as a single two-dimensional shape,
a persistence of the image marker is displayed by changing a color or intensity of the image marker over the response-time period, and
a disappearance of the of the image marker corresponds to an end of the response-time period.

19. The apparatus of claim 17, wherein the path of the gesture in the first input mode defines an input to an application program that generates the new shape on the display screen based on one or more spatial attributes of the path.

20. The apparatus of claim 17, wherein the gesture in the first input mode defines the new shape by completing a closed curve that corresponds to the outline of the new shape.

21. The apparatus of claim 17, wherein the path starting from the second location defines the new shape in the first input mode by reaching a path-ending location that satisfies a completion condition for the new shape.

22. The apparatus of claim 17, wherein the scale factor in the second input mode is based on one or more line lengths measured from the image marker to the path.

23. The apparatus of claim 17, wherein the first and second screen inputs and the gesture each result from touching the display screen.

24. The apparatus of claim 17, wherein the first and second screen inputs and the gesture each result from an application of a computer pointing device whose movements are echoed on the display screen by a pointer.

* * * * *